UNITED STATES PATENT OFFICE.

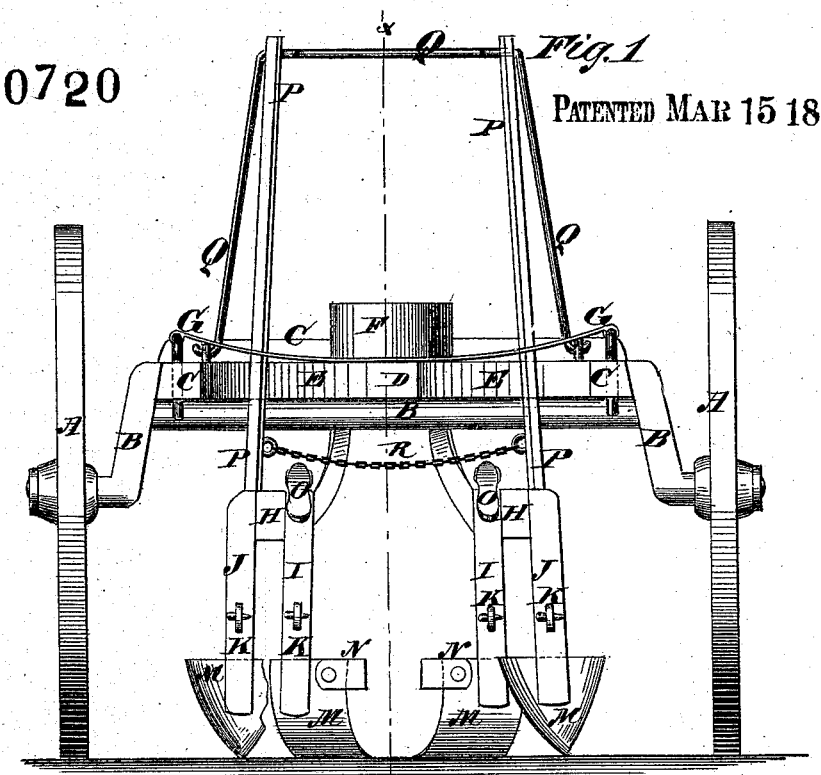
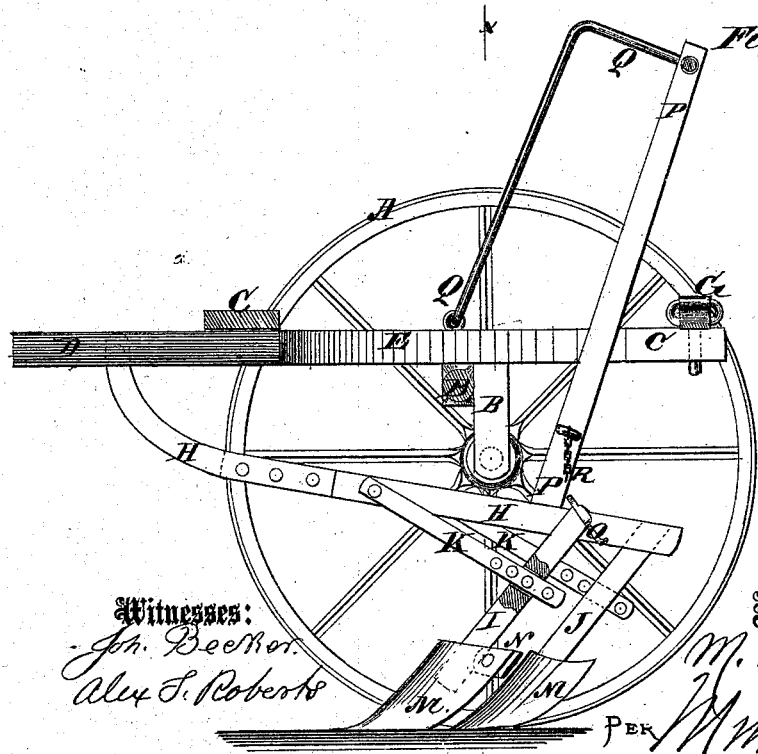

MARTIN BRUNER, JR., OF FREMONT, OHIO.

IMPROVEMENT IN CULTIVATORS.

Specification forming part of Letters Patent No. 100,720, dated March 15, 1870.

*To all whom it may concern:*

Be it known that I, MARTIN BRUNER, Jr., of Fremont, in the county of Sandusky and State of Ohio, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a rear view of my improved cultivator. Fig. 2 is a vertical longitudinal section of the same, taken through the line $x\ x$, Fig. 1.

Similar letters of reference indicate corresponding parts.

My invention has for its object to provide an improved arrangement of means for raising and lowering the plows, whereby this operation may be more quickly, conveniently, and easily effected than heretofore in machines of this class; and the improvement consists in the combination of certain parts, as hereinafter specified.

A are the wheels.

B is the axle, which is bent twice at each end nearly at right angles, so that the middle or horizontal part of the said axle may be about eighteen inches higher than its journals, as shown in Fig. 1.

C is the frame of the cultivator, which is securely attached to the axle B.

D is the tongue, the rear end of which is securely attached to the front cross-bar of the frame C and to the forward ends of the hounds E, the rear ends of which are securely attached to the side bars of the frame C. By this construction the driver, from his seat F, will have an unobstructed view of the row of plants being cultivated. The seat F is attached to a spring, G, the ends of which are connected with the rear ends of the side bars of the frame C.

H are the plow-beams, the forward ends of which are loosely but securely pivoted to the forward part of the hounds E or other suitable part of the frame-work of the cultivator, so that the rear ends of said beams may have a free vertical and lateral movement.

To the rear parts of each of the beams H are attached two standards, I J, the forward standards, I, being attached to the inner and the rear standards, J, to the outer sides of said beams. The upper ends of the standards I J are secured by bolts to the plow-beams H, and the draft-strain upon said standards is sustained by the brace-bars K, the forward ends of which are secured to the beams H, and the rear ends of which pass through slots in the lower parts of the standards I J, and have wooden pins L passed through holes in them at the rear sides of the said standards, as shown in Figs. 1 and 2, so that should the plows strike an obstruction the said pins L may break and allow the standards to turn back, thus guarding the cultivator from being broken. Several holes are formed in the rear parts of the brace-bars K for the reception of the pins L, so that by shifting the said pins L the pitch of the plows may be adjusted as desired.

M are the plows, which are attached to the standards I J. To the upper part of the inner sides of the forward plows are attached wings N, which project toward the row of plants being cultivated, so as to throw the soil raised by said plows close around said plants. The wings N should be adjustably attached to the plows M, so that they may be adjusted to move the soil more or less closely toward the plants, as may be required.

O are the foot-rests connected with the beams H, so that the driver, by a side movement of his feet, may easily guide the plows in cultivating crooked rows or in avoiding irregular hills.

P are upright bars, the lower ends of which are pivoted to the beams H, and the upper ends of which are pivoted to the rod or rods Q, the lower ends of which are pivoted to the hounds E, or to some other suitable part of the frame-work of the cultivator. I pivot the upper ends of the upright bars P to loops formed upon the rod Q, so that the said rod may hold the upper ends of the bars P in their proper relative position. The lower parts of the upright bars P are connected by a chain, R, to prevent said bars from being moved too far apart, and at the same time allow them to be moved freely toward each other when required.

By this construction, by forcing the upper parts of the bars P forward, the rear ends of the plow-beams H, and consequently the plows, may be raised from the ground, and by drawing the upper parts of said bars rearward the rear ends of the said plow-beams will be depressed and the plows lowered to or forced more deeply into the ground.

Having thus described my invention, I claim as new and desire to secure by Letters Patent—

The rod Q, bent as shown, and pivoted at its ends to the hounds E, and the bars P, pivoted thereto and to the beams H, whereby the forward movement of said rod will elevate and the reverse movement lower the plows, as set forth.

MARTIN BRUNER, Jr.

Witnesses:
HIRAM M. SHAW,
J. W. GROAT.